US010927262B2

(12) United States Patent
Sakoda et al.

(10) Patent No.: US 10,927,262 B2
(45) Date of Patent: Feb. 23, 2021

(54) METHOD FOR PRODUCING OXIDIZED CARBON BLACK AQUEOUS DISPERSION, AND METHOD FOR PRODUCING OXIDIZED CARBON BLACK AQUEOUS DISPERSION FOR INKJET INK

(71) Applicant: TOKAI CARBON CO., LTD., Tokyo (JP)

(72) Inventors: Takuya Sakoda, Tokyo (JP); Yoshihiro Sato, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 785 days.

(21) Appl. No.: 15/547,244

(22) PCT Filed: Jan. 20, 2016

(86) PCT No.: PCT/JP2016/051521
§ 371 (c)(1),
(2) Date: Jul. 28, 2017

(87) PCT Pub. No.: WO2016/121588
PCT Pub. Date: Aug. 4, 2016

(65) Prior Publication Data
US 2018/0022926 A1  Jan. 25, 2018

(30) Foreign Application Priority Data
Jan. 30, 2015 (JP) .................... 2015-017015

(51) Int. Cl.
C09C 1/56 (2006.01)
B41J 2/01 (2006.01)
C09D 11/324 (2014.01)
B41M 5/00 (2006.01)
C09D 17/00 (2006.01)

(52) U.S. Cl.
CPC ............ *C09C 1/565* (2013.01); *B41J 2/01* (2013.01); *B41M 5/00* (2013.01); *C09D 11/324* (2013.01); *C09D 17/00* (2013.01); *C09D 17/005* (2013.01); *C01P 2004/51* (2013.01); *C01P 2004/62* (2013.01); *C01P 2006/22* (2013.01); *C01P 2006/40* (2013.01)

(58) Field of Classification Search
CPC .. C09C 1/565; B41J 2/01; B41M 5/00; C09D 11/324; C09D 17/00; C09D 17/005; C01P 2004/51; C01P 2004/62; C01P 2006/22; C01P 2006/40
See application file for complete search history.

(56) References Cited

U.S. PATENT DOCUMENTS

2002/0088375 A1  7/2002  Komatsu et al.
2003/0058318 A1  3/2003  Sago et al.
2005/0120914 A1  6/2005  Momose et al.
2005/0124726 A1  6/2005  Yatake et al.
2009/0114119 A1  5/2009  Horii
2011/0187799 A1  8/2011  Aoyama et al.
2011/0217229 A1  9/2011  Inomata et al.
2012/0171104 A1  7/2012  Arai et al.
2013/0338310 A1  12/2013  Shimamura et al.

FOREIGN PATENT DOCUMENTS

| CN | 1692144 A | 11/2005 |
|---|---|---|
| CN | 101233198 A | 7/2008 |
| EP | 1914276 A1 | 4/2008 |
| EP | 1935947 A1 | 6/2008 |
| JP | 10-219165 A | 8/1998 |
| JP | 10-287836 A | 10/1998 |
| JP | 11-166131 A | 6/1999 |
| JP | 2002-327144 A | 11/2002 |
| JP | 2003-183558 A | 7/2003 |
| JP | 2005-113091 A | 4/2005 |
| JP | 2011-157425 A | 8/2011 |
| WO | 03/033602 A1 | 4/2003 |
| WO | 2010/035871 A1 | 4/2010 |
| WO | 2011/007730 A1 | 1/2011 |

(Continued)

OTHER PUBLICATIONS

Extended (supplementary) European Search Report dated Sep. 19, 2018, issued in counterpart European Application No. 16743192.3. (8 pages).
International Search Report dated Apr. 26, 2016, issued in counterpart International Application No. PCT/JP2016/051521 (3 pages).
Office Action dated Mar. 3, 2020, issued in counterpart CN application No. 20168007902.5, with English translation. (17 pages).

(Continued)

*Primary Examiner* — Pegah Parvini
(74) *Attorney, Agent, or Firm* — Westerman, Hattori, Daniels & Adrian, LLP

(57) ABSTRACT

Provided is a method for easily producing an oxidized carbon black aqueous dispersion that can highly remove multivalent metal ions and exhibit excellent dispersion stability.

A method for producing an oxidized carbon black aqueous dispersion by successively performing on an aqueous slurry of oxidized carbon black having one or more anionic functional groups on a surface thereof a neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof and a separation and removal step of separating and removing a multivalent metal ion chelate complex from a mixed solution obtained at the neutralization step using a separation membrane.

20 Claims, No Drawings

(56) References Cited

FOREIGN PATENT DOCUMENTS

WO 2012/086789 A1 6/2012

OTHER PUBLICATIONS

Office Action dated Aug. 12, 2020, issued in counterpart CN Application No. 201680007902.5, with English translation (18 pages).

Office Action dated Dec. 21, 2020, issued in counterpart CN Application No. 201680007902.5, with English Translation. (21 pages).

METHOD FOR PRODUCING OXIDIZED CARBON BLACK AQUEOUS DISPERSION, AND METHOD FOR PRODUCING OXIDIZED CARBON BLACK AQUEOUS DISPERSION FOR INKJET INK

TECHNICAL FIELD

The present invention relates to method of producing oxidized carbon black aqueous dispersion and a method of producing oxidized carbon black aqueous dispersion for inkjet ink composition.

BACKGROUND ART

In recent years, the inkjet printing has been widely adopted by consumer and industrial printing.

The inkjet printing is a method that discharges ink droplets from fine nozzle heads to print characters and images onto a surface of various kinds of recording media such as paper and has the advantage that image formation can be performed on demand easily without preparing any printing plate by performing printing onto various kinds of recording media such as plain paper in a noncontact manner.

In order to improve the safety and reduce the environmental load of inkjet ink composition (an ink composition for inkjet printers), aqueous inkjet ink compositions and solvent-free inkjet ink compositions have been spreading to replace the organic solvent-based ink compositions in recent years.

Carbon black is widely used as a black pigment for use in such aqueous inkjet ink compositions; carbon black is hydrophobic and shows little wettability against water, and acidic carbon black that can be self-dispersed in aqueous inkjet compositions is developed by imparting anionic functional groups (acidic functional groups) such as a 13 $COO^-$ group, an $-SO_3^-$ group, and a $-PO_4^{2-}$ group to the surface of carbon black and further causing alkaline counter ions to be present.

The applicant has developed oxidized carbon black fine particles with acidic functional groups imparted to their surfaces by granulating carbon black fine particles by a wet process, performing pulverization treatment thereon, and subjecting the obtained pulverized product to wet oxidation treatment in an aqueous medium (refer to Patent Document 1 (WO 2011/007730)), for example.

RELATED-DOCUMENT

Patent Document

Patent Document 1: WO 2011/007730

SUMMARY OF THE INVENTION

Problems to be Solved by the Invention

Carbon black is currently produced by various methods such as the furnace process, the channel process, and the thermal process with heating fuel oil, carbonized components of coal, aromatic hydrocarbon oil obtained by oil refining treatment, and the like as raw materials; these raw materials contain multivalent metal components such as Fe, Ni, and Ca, and obtained carbon black contains these multivalent metal components as impurities while being further concentrated.

In addition, metal components contained in cooling water used in the production process of carbon black and metal components eluted caused by the metallic corrosion of production equipment mix into carbon black.

Given these circumstances, when a carbon black aqueous dispersion is attempted to be prepared using the carbon black, multivalent metal ions may mix into the carbon black aqueous dispersion, and it has been found out that when the acidic carbon black with the anionic functional groups (the acidic functional groups) added to a surface thereof is used as the carbon black in particular, the multivalent metal ions and the anionic functional groups provided on the surface of the acidic carbon black bind to each other to form a colloidal hydrolysate, and with this colloidal hydrolysate as foreign matter, metal may precipitate at a nozzle part when used for inkjet ink compositions, or insoluble matter may precipitate in inkjet ink compositions.

Examples of a method for removing the metal components mixed into the carbon black aqueous dispersion include treatment with ion-exchange resin and repeated washing treatment with pure water.

However, the ion-exchange resin has limited exchange capacity, and requires frequent regeneration of the ion-exchange resin. In addition, research by the inventors of the present invention has found out that when objects to be removed are the multivalent metal ions, they are difficult to be sufficiently removed even with repeated washing with water. It is considered that this is because anionic functional groups such as $-COO^-$ group, $-SO_3^-$ group, and $-PO_4^{2-}$ group formed on the surface of oxidized carbon black contained in the carbon black aqueous dispersion capture the metal ions through chelating action, and the metal ions are not easily eluted with the ion-exchange resin or through washing with pure water.

Another examples of the method for removing the metal components mixed into the carbon black aqueous dispersion include treatment with a chelating agent; research by the inventors of the present invention has found out that although the chelating agent can capture metallic impurities in an ionic state in water, it is difficult to remove the multivalent metal ions captured by the anionic functional groups on the surface of the carbon black, and it is difficult to remove divalent metal ions such as Ni ions, Zn ions, Ca ions, and Mg ions in particular.

Given these circumstances, an object of the present invention is to provide a method for easily producing an oxidized carbon black aqueous dispersion that can highly remove multivalent metal ions and exhibit excellent dispersion stability and to provide a method for producing an oxidized carbon black aqueous dispersion for an inkjet ink composition.

Means for Solving the Problems

To achieve the above object, dedicated research by the inventors of the present invention has found out that the above problems can be solved by producing an oxidized carbon black aqueous dispersion by successively performing on an aqueous slurry of oxidized carbon black having one or more anionic functional groups on a surface thereof a neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof and a separation and removal step of separating and removing a multivalent metal ion chelate complex from a mixed solution obtained at the neutralization step using a separation membrane and has achieved the present invention based on the findings.

In other words, the present invention provides:

(1) a method for producing an oxidized carbon black aqueous dispersion by successively performing on an aqueous slurry of oxidized carbon black having one or more anionic functional groups on a surface thereof:

a neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof; and a separation and removal step of separating and removing a multivalent metal ion chelate complex from a mixed solution obtained at the neutralization step using a separation membrane;

(2) the method for producing an oxidized carbon black aqueous dispersion according to (1), in which at the neutralization step the alkali metal hydroxide is mixed with the aqueous slurry of oxidized carbon black so that a pH of the mixture is 6 to 12;

(3) the method for producing an oxidized carbon black aqueous dispersion according to (1), in which the water-soluble chelating agent is an aminocarboxylic acid and a salt thereof;

(4) the method for producing an oxidized carbon black aqueous dispersion according to (2), in which the water-soluble chelating agent is an aminocarboxylic acid and a salt thereof;

(5) the method for producing an oxidized carbon black aqueous dispersion according to (1), in which the aqueous slurry of oxidized carbon black having one or more anionic functional groups on a surface thereof is obtained by subjecting carbon black to oxidation treatment by a liquid phase method, mixing the carbon black with one or more selected from a water-soluble chelating agent and a salt thereof under a condition of pH 2 to pH 4, and then preliminarily separating multivalent metal ions using a separation membrane;

(6) the method for producing an oxidized carbon black aqueous dispersion according to (2), in which the aqueous slurry of oxidized carbon black having one or more anionic functional groups on a surface thereof is obtained by subjecting carbon black to oxidation treatment by a liquid phase method, mixing the carbon black with one or more selected from a water-soluble chelating agent and a salt thereof under a condition of pH 2 to pH 4, and then preliminarily separating multivalent metal ions using a separation membrane;

(7) the method for producing an oxidized carbon black aqueous dispersion according to (3), in which the aqueous slurry of oxidized carbon black having one or more anionic functional groups on a surface thereof is obtained by subjecting carbon black to oxidation treatment by a liquid phase method, mixing the carbon black with one or more selected from a water-soluble chelating agent and a salt thereof under a condition of pH 2 to pH 4, and then preliminarily separating multivalent metal ions using a separation membrane;

(8) the method for producing an oxidized carbon black aqueous dispersion according to (1), in which the separation membrane is an ultrafiltration membrane (UF), a reverse osmosis membrane (RO), or an electrodialysis membrane;

(9) the method for producing an oxidized carbon black aqueous dispersion according to (2), in which the separation membrane is an ultrafiltration membrane (UF), a reverse osmosis membrane (RO), or an electrodialysis membrane;

(10) the method for producing an oxidized carbon black aqueous dispersion according to (3), in which the separation membrane is an ultrafiltration membrane (UF), a reverse osmosis membrane (RO), or an electrodialysis membrane; and

(11) a method for producing a carbon black aqueous dispersion for an inkjet ink composition performing centrifugal separation treatment on an oxidized carbon black aqueous dispersion obtained by the method according to any one of (1) to (10) to remove a coarse grain component.

Effects of the Invention

According to the present invention, by performing on an aqueous slurry of oxidized carbon black having one or more anionic functional groups on a surface thereof a neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof, the multivalent metal ions captured by the anionic functional groups on the surface of the oxidized carbon black are gradually captured by the chelating agent to be replaced with alkali metal ions, and subsequently, by performing a separation and removal step of separating and removing the multivalent metal ions captured by the chelating agent, a high degree of dispersibility owing to the repulsive force of the alkali metal ions can be imparted to the oxidized carbon black.

Consequently, the present invention can provide a method for easily producing an oxidized carbon black aqueous dispersion, in which multivalent metal ions are highly removed, and excellent dispersion stability is exhibited, and a method for producing an oxidized carbon black aqueous dispersion for an inkjet ink composition.

DESCRIPTION OF EXEMPLARY EMBODIMENTS

A method for producing an oxidized carbon black aqueous dispersion of the present invention successively performs on an aqueous slurry of oxidized carbon black having one or more anionic functional groups on a surface thereof a neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof and a separation and removal step of separating and removing a multivalent metal ion chelate complex from a mixed solution obtained at the neutralization step using a separation membrane.

In an aqueous pigment dispersion composition of the present invention, a carbon black contained in the oxidized carbon black is not limited to a particular carbon black and can be furnace black, channel black, acetylene black, or thermal black; these carbon blacks may be any of acid, neutral, and basic ones. When the carbon black is acid one, it may be used as the oxidized carbon black as it is or used as the oxidized carbon black after being subjected to oxidation treatment to a desired extent.

The carbon blacks are high in a carbon content, are high in blackness originating from their amorphous structures, are higher in a drying rate, are higher in storage stability, are lower in price than peach black, lampblack, and the like, and can be thereby suitably used.

Among the carbon blacks, when ultrafine carbon blacks such as furnace black and channel black are used as aqueous pigment dispersions for ink compositions for inkjet printers, compositions with high resolution and excellent print quality can be achieved.

The carbon black has a nitrogen adsorption specific surface area ($N_2SA$) of preferably 25 $m^2/g$ to 300 $m^2/g$, more preferably 100 $m^2/g$ to 300 $m^2/g$, and further preferably 100 $m^2/g$ to 180 $m^2/g$.

The carbon black has a DBP absorption number of preferably 120 $cm^3/100$ g or higher, more preferably 120 $cm^3/100$ g to 180 $cm^3/100$ g, and further preferably 130 $cm^3/100$ g to 170 $cm^3/100$ g.

The $N_2SA$ and the DBP absorption number of the carbon black being within the ranges can improve colloidal characteristics within an aqueous medium and exhibit excellent dispersibility against the aqueous medium and ink performance when the obtained oxidized carbon black aqueous dispersion is used for inkjet ink compositions.

In the present application document, the $N_2SA$ of the carbon black means a value measured in accordance with "Carbon black for rubber industry—Fundamental characteristics—Part 2, Determination of specific surface area—Nitrogen adsorption methods—Single-point procedures" stipulated in JIS K6217-2, whereas the DBP absorption number means a value measured in accordance with "Carbon black for rubber industry—Fundamental characteristics—Part 4, Determination of DBP absorption number" stipulated in JIS K6217-4.

The average particle diameter of the carbon black is preferably 30 nm to 300 nm, more preferably 40 nm to 270 nm, and further preferably 50 nm to 250 nm.

In the present application document, the average particle diameter of the carbon black means a particle diameter with a cumulative particle size of 50% in volume-based cumulative particle size distribution (a volume average particle diameter D50) measured by a laser diffraction type particle size distribution measuring apparatus.

Specific examples of the carbon black include Seast 9, Seast 6, Tokablack #4500, Tokablack #8500, Tokablack #8500F, Tokablack #7550SB, and Tokablack #7550F (manufactured by Tokai Carbon Co., Ltd.); #650, #750, MA600, #44B, #44, #45B, MA7, MA11, #47, #45, #33, #45L, #47, #50, #52, MA77, and MA8 (manufactured by Mitsubishi Chemical Corporation); FW200, FW2V, FWI, FW18PS, NIpex180IQ, FW1, Special Black 6, S160, and S170 (manufactured by Orion Engineered Carbons); Black Pearls 1000M, Black Pearls 800, Black Pearls 880, Monarch 1300, Monarch 700, Monarch 880, CRX 1444, Regal 330R, Regal 660R, Regal 660, Regal 415R, Regal 415, Black Pearls 4630, and Monarch 4630 (manufactured by Cabot Corporation); Raven 7000, Raven 3500, Raven 5250, Raven 5750, Raven 5000 ULTRA II, HV 3396, Raven 1255, Raven 1250, Raven 1190, Raven 1000, Raven 1020, Raven 1035, Raven 1100 ULTRA, Raven 1170, and Raven 1200 (manufactured by Columbian); DB1305 (manufactured by KOSCO); SUNBLACK 700, 705, 710, 715, 720, 725, 300, 305, 320, 325, X25, and X45 (manufactured by Asahi Carbon Co., Ltd.); N220, N110, N234, and N121 (manufactured by Sid Richardson); Niteron #300 (manufactured by NSCC Carbon Co., Ltd.); and Shoblack N134, N110, N220, N234, and N219 (manufactured by Showa Cabot K.K.).

In the method for producing an oxidized carbon black aqueous dispersion according to the present invention, for the oxidized carbon black, anionic functional groups (acidic groups) can be imparted to a surface of the carbon black described above by a method of oxidation treatment with an oxidant, a method of sulfonation treatment, a method of reaction with a diazonium salt, or the like.

The oxidation treatment with the oxidant can be performed by known methods such as a liquid phase method and a vapor phase method.

When the oxidation treatment is performed by the liquid phase method, examples of the oxidant include nitric acid, sulfuric acid, chloric acid, peroxydiacids such as peroxosulfuric acid, peroxoboric acid, peroxocarbonic acid, and peroxophosphoric acid, permanganic acid, dichromic acid, chlorous acid, perchloric acid, hypohalous acids, hydrogen peroxide, phosphonic acid, phosphoric acid, phosphorous acid, phosphinic acid, and salts of these acids; examples of the salts include salts of alkali metals such as lithium, sodium, and potassium and ammonium salts.

In the liquid phase method, for example, the carbon black is charged into a dispersion liquid containing the oxidant, and stirring treatment is performed, thereby obtaining carbon black having the anionic functional groups (the acidic groups) on a surface thereof.

A solvent that disperses the oxidant is preferably an aqueous medium, and examples of the aqueous medium include water and water-soluble organic solvents; water, especially deionized water is preferred in view of economy and safety.

To uniformly disperse the carbon black particles, a surfactant may be added to the dispersion liquid containing the oxidant; as to the surfactant, any of anionic ones, nonionic ones, and cationic ones can be used.

The degree of liquid phase oxidation can be controlled by adjusting oxidant concentration within the dispersion liquid containing the oxidant, the ratio of the amount of carbon black particles to be mixed with an oxidant aqueous solution, oxidation treatment temperature, treatment time, stirring rate, and the like.

The liquid phase oxidation can be performed, for example, by adding the carbon black particles with an appropriate amount ratio to the oxidant aqueous solution with concentration adjusted to be mixed therewith and stirring the mixture on a temperature condition of room temperature to about 90° C. and preferably 60° C. to 90° C. for 1 hour to 20 hours to form a slurry.

In the liquid phase oxidation treatment, the carbon black particles may be subjected to wet oxidation or dry oxidation in advance; through wet oxidation or dry oxidation in advance, the carbon black particles can be efficiently dispersed in the oxidant aqueous solution, and the liquid phase oxidation can be performed uniformly and efficiently.

The method that imparts the anionic functional groups (the acidic groups) to the surface of the carbon black by reacting the diazonium salt is a method that binds various kinds of anionic functional groups such as —$C_6H_4$—COOH, —$C_6H_4$—$SO_3H$, and —$C_6H_4$—$PO_4^{2-}H_2$ to the surface of the carbon black via benzene rings by diazo coupling. The detail of the method is described in Translation of PCT Application No. 2000-512329 and the like.

Examples of the vapor phase oxidation method include a method that exposes the carbon black particles to a gas atmosphere such as ozone, air, NOx, or SOx; the vapor phase method has the advantages that drying costs are not involved and that operation is simpler than the liquid phase method.

If a reduction salt in the slurry generated by the liquid phase oxidation is removed after the oxidized carbon black is generated by the liquid phase method, a neutralization reaction process described below can be progressed smoothly and efficiently. The removal of the reduction salt can be performed using a separation membrane such as an ultrafiltration membrane (UF), a reverse osmosis membrane (RO), or an electrodialysis membrane.

As to the degree of removal of the reduction salt, purification is desirably performed so as to give an electric conductivity of lower than 5 mS/cm when a carbon black dispersion density is 20% by mass, for example. Insufficient separation and purification causes a reduction in water dispersibility and dispersion stability and an increase in the viscosity of the dispersion liquid and makes equipment corrosion caused by the dispersion liquid likely to occur.

After the carbon black is subjected to oxidation treatment by the liquid phase method, and subsequently the treated liquid and one or more selected from a water-soluble chelating agent and a salt thereof are mixed with each other under a condition of preferably pH 2 to pH 4, more preferably pH 2.1 to pH 3.9, and further preferably pH 2.3 to pH 3.8, the removal treatment of the reduction salt is preferably performed.

By forming one or more anionic functional groups (acidic functional groups) selected from a 13 COO⁻ group, an —$SO_3^-$ group, and a —$PO_4^{2-}$ group on the surface of the carbon black, pH within the liquid phase can be easily maintained at and controlled to the above range.

The water-soluble chelating agent, which is not limited to a particular agent, is preferably an amino carboxylic acid and a salt thereof.

The amino carboxylic acid and a salt thereof can be one or more selected from ethylenediaminetetraacetic acid [EDTA], nitrilotriacetic acid, diethylenetriaminepentaacetic acid [DTPA], hydroxyethyl ethylenediaminetriacetic acid, triethylenetetraminehexaacetic acid [TTHA], 1,3-propanediaminetetraacetic acid, 1,3-diamino-2-hydroxypropanetetraacetic acid [CyDTA], hydroxyethylene iminodiacetic acid, dihydroxyethyl glycine, glycol ether diaminetetraacetic acid, ethylenediaminediorthohydroxyphenylacetic acid [EDDHA], ethylenediamine-N,N'-bis[(2-hydroxy-5-methylphenyl)acetic acid] [EDDHMA], N,N'-bis(2-hydroxybenzyl)ethylenediamine-N,N-diacetic acid [HBED], N,N'-bis (2-hydroxy-5-methylbenzyl)ethylenediamine-N,N'-diacetic acid [HMBED], dicarboxymethyl glutamic acid, ethylenediamine-N,N'-disuccinic acid, ethylenediaminetetrakis (methylenephosphonic acid) [EDTPO], nitrilotris(methylenephosphonic acid) [NTPO], propylenediaminetetra (methylenephosphonic acid) [PDTMP], 1-hydroxyethane-1, 1-diphosphonic acid [HEDP], and salts thereof.

The amino acid carboxylic acid and a salt thereof is preferably ethylenediaminetetraacetate; specific examples of ethylenediaminetetraacetate include sodium ethylenediaminetetraacetate and potassium ethylenediaminetetraacetate.

The contact amount of the water-soluble chelating agent and a salt thereof relative to the oxidized carbon black is preferably 0.1 part by mass or more, more preferably 0.5 part by mass or more, and further preferably 1.0 part by mass or more relative to 100 parts by mass of an oxidized carbon black solid content.

The contact amount of the water-soluble chelating agent and a salt thereof relative to the oxidized carbon black is preferably 15 parts by mass or less, more preferably 12.5 parts by mass or less, and further preferably 10 parts by mass or less relative to 100 parts by mass of the oxidized carbon black solid content.

If the contact amount of the water-soluble chelating agent and a salt thereof relative to the oxidized carbon black is less than 0.1 part by mass relative to 100 parts by mass of the oxidized carbon black solid content, it becomes difficult for the complex between the multivalent metal ions and the water-soluble chelating agent to be sufficiently formed; if the contact amount exceeds 15 parts by mass relative to 100 parts by mass of the oxidized carbon black solid content, it becomes difficult for the amount of the complex formed to increase further, which is uneconomical.

When a dispersion liquid obtained by subjecting the carbon black to oxidation treatment by the liquid phase method and the water-soluble chelating agent and a salt thereof are brought into contact with each other, examples of the method include a method that mixes the dispersion liquid with the water-soluble chelating agent and a salt thereof and stirs the mixture.

When the dispersion liquid and the water-soluble chelating agent and a salt thereof are brought into contact with each other, the contact temperature is preferably 40° C. or higher, more preferably 50° C. or higher, and further preferably 60° C. or higher.

The contact time is preferably 30 minutes or more, more preferably 1 hour or more, and further preferably 3 hours or more.

By mixing the dispersion liquid and the water-soluble chelating agent and a salt thereof with pH 2 to pH 4, the water-soluble chelating agent binds to the multivalent metal ions, especially trivalent metal ions such as $Fe^{3+}$, $Al^{3+}$, and $Cr^{3+}$ contained in the liquid phase to form the multivalent metal ion chelate complex, and this multivalent metal ion chelate complex can also be preliminarily separated during the removal treatment of the reduction salt, whereby the content of the multivalent metal ions in the liquid phase can be easily reduced.

An oxidized carbon black slurry obtained by the removal treatment (purification treatment) of the reduction salt is maintained at a pH of 2 to 4 even after the purification treatment owing to the acidic functional groups such as a 13 COO⁻ group, an —$SO_3^-$ group, and a —$PO_4^{2-}$ group formed on the surface of the carbon black.

Consequently, even when the chelate complex with the multivalent metal ions mainly including the trivalent metal ions remains in the slurry after the removal treatment of the reduction salt is performed, chelate bonding between the water-soluble chelating agent and the multivalent metal ions is maintained, and the multivalent metal ions are prevented from being captured on the surface of the carbon black at the subsequent neutralization step.

The thus obtained oxidized carbon black is preferably self-dispersed carbon black having acidic groups on a surface thereof.

The self-dispersed carbon black having acidic groups on a surface thereof means a carbon black in which at least one kind of hydrophilic groups including an acidic group binds to the surface of the carbon black directly or via another atomic group, can retain a stable dispersed state without adding any surfactant or polymer compound when being suspended in water, and in which the surface tension of the dispersion liquid shows a value almost equivalent to that of water.

In the method for producing an oxidized carbon black aqueous dispersion according to the present invention, the acidic hydroxy group amount of the oxidized carbon black is preferably 350 µmol/g to 1,500 µmol/g, more preferably 470 µmol/g to 1,150 µmol/g, and further preferably 600 µmol/g to 900 µmol/g.

In the method for producing an oxidized carbon black aqueous dispersion according to the present invention, the acidic hydroxy group amount of the oxidized carbon black means the sum of the carboxy group (—COO$^-$) amount and the hydroxy (—O$^-$) group amount of the oxidized carbon black. When the dispersibility of the oxidized carbon black in an aqueous medium and the like are considered, the acidic hydroxy group is important as the functional group of the surface of the carbon black particles, and a carboxy group and a hydroxy group in particular play a big role; the acidic hydroxy group of the oxidized carbon black can be substantially regarded as the sum of the carboxy group amount and the hydroxy group amount.

In the method for producing an oxidized carbon black aqueous dispersion according to the present invention, the oxidized carbon black has a carboxy group equivalent of preferably 300 µmol/g to 1,200 µmol/g, more preferably 400 µmol/g to 900 µmol/g, and further preferably 500 µmol/g to 700 µmol/g.

In the present application document, the carboxy group amount means a value when 2 g of the oxidized carbon black is added to 0.5 dm$^3$ of 0.976 mol/dm$^3$ sodium hydrogencarbonate, which is shaken for 6 hours, trivalent carbon black is filtered out from the reaction liquid, and the filtrate is neutralization-titrated with 0.05 mol/dm$^3$ sodium hydroxide aqueous solution.

In the method for producing an oxidized carbon black aqueous dispersion according to the present invention, the oxidized carbon black has a hydroxy group amount of preferably 50 µmol/g to 300 µmol/g, more preferably 70 µmol/g to 250 mmol/g, and further preferably 100 µmol/g to 200 µmol/g.

In the present application document, the hydroxy group amount means a value obtained by a method that dissolves 2,2'-diphenyl-1-picrylhydrazyl (DPPH) in carbon tetrachloride to produce a 5×10$^{-4}$ mol/l solution, adds 0.1 g to 0.6 g of oxidized carbon black particles to the solution, stirs the solution in a thermostatic bath at 60° C. for 6 hours, filters out the oxidized carbon black particles, measures the filtrate by a UV absorption spectrometer to calculate the hydroxy group amount from absorbance.

In the method for producing an oxidized carbon black aqueous dispersion according to the present invention, an —SO$_3$H group amount and a —PO$_4$H$_2$ group amount may be selected as appropriate.

In the present application document, the —SO$_3$H group amount and the —PO$_4$H$_2$ group amount mean values obtained by the same method as that for the carboxy group amount after the oxidized carbon black is generated by the liquid phase method, for example, the intensity of binding energy on the surface of the carbon black is measured using an X-ray photoelectron spectrometer (Type S-Probe ESCA 2803 manufactured by Surface Science Instruments) for the oxidized carbon black from which the reduction salt in the slurry generated by the liquid phase oxidation has been removed and further water has been removed to identify the —SO$_3$H group and the —PO$_4$H$_2$ group.

The oxidized carbon black has an average particle diameter at the time of being dispersed in water of preferably 30 nm to 300 nm, more preferably 40 nm to 270 nm, and further preferably 50 nm to 250 nm.

In the present application document, the average particle diameter of the carbon black means a particle diameter with a cumulative particle size of 50% in volume-based cumulative particle size distribution (a volume average particle diameter D50) measured by a laser diffraction type particle size distribution measuring apparatus.

In the method for producing an oxidized carbon black aqueous dispersion according to the present invention, the oxidized carbon black is suppled in an aqueous slurry state to the neutralization step.

Examples of an aqueous medium that disperses the oxidized carbon black include water and water-soluble organic solvents; water, especially deionized water is preferred in view of economy and safety.

The solid content concentration of the oxidized carbon black in the aqueous slurry is preferably 1.0% to 20.0% by mass, more preferably 1.0% to 15.0% by mass, and further preferably 1.0% to 10.0% by mass.

The method for producing an oxidized carbon black aqueous dispersion according to the present invention performs on an aqueous slurry of oxidized carbon black having one or more anionic functional groups on a surface thereof the neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof on a surface thereof.

The water-soluble chelating agent can be one or more selected from those described above. The contact amount of the water-soluble chelating agent and a salt thereof relative to 100 parts by mass of the oxidized carbon black solid content is also similar to the contact amount described above.

At the neutralization step,
(i) after one or more selected from the water-soluble chelating agent the and salt thereof is mixed with the aqueous slurry of the oxidized carbon black having one or more anionic functional groups on a surface thereof, the alkali metal hydroxide may be mixed therewith to perform heating/neutralization treatment,
(ii) one or more selected from the water-soluble chelating agent and the salt thereof and the alkali metal hydroxide may be simultaneously mixed with the aqueous slurry of the oxidized carbon black having one or more anionic functional groups on a surface thereof to perform heating/neutralization treatment, or
(iii) after the alkali metal hydroxide is mixed with the aqueous slurry of the oxidized carbon black having one or more anionic functional groups on a surface thereof to perform heating/neutralization treatment, one or more selected from the water-soluble chelating agent and the salt thereof may be mixed therewith.

The mixing timing for the aqueous slurry of the oxidized carbon black having one or more anionic functional groups on a surface thereof and one or more selected from the water-soluble chelating agent and the salt thereof at the neutralization step may be selected from (i) to (iii) as appropriate; through the heating/neutralization treatment at the neutralization step, metallic impurity components contained in the oxidized carbon black are gradually eluted to be replaced with alkali metal.

The alkali metal hydroxide used at the neutralization step can be one or more selected from sodium hydroxide, lithium hydroxide, and potassium hydroxide.

The amount of use of the alkali metal hydroxide at the neutralization step, which can be determined as appropriate in accordance with the oxidized carbon black to be neutralized, is preferably the mixing of the alkali metal hydroxide with the aqueous slurry of the oxidized carbon black so that a pH of the mixture is 6.0 to 12.0, more preferably the mixing of the alkali metal hydroxide so that a pH of the mixture is 7.0 to 12.0, and further preferably the mixing of the alkali metal hydroxide so that a pH of the mixture is 8.0 to 12.0.

The alkali metal hydroxide is mixed with the aqueous slurry of the oxidized carbon black so that a pH of the mixture is 6.0 to 12.0, and heating/neutralization is performed, whereby the multivalent metal ions, especially divalent metal ions (such as divalent iron ions, zinc ions, nickel ions, magnesium ions, and calcium ions) captured on the surface of the oxidized carbon black are eluted to be replaced with the alkali hydroxide, and the eluted multivalent metal ions form the multivalent metal ion chelate complex together with the aqueous chelating agent to be water-soluble and to be dissolved in the slurry, which can be easily removed by membrane separation.

The alkali hydroxide is preferably added in an aqueous solution state to the aqueous slurry of the oxidized carbon black having one or more anionic functional groups on a surface thereof, and examples of the aqueous medium contained in the aqueous solution include water and water-soluble organic solvents; water, especially deionized water is preferred in view of economy and safety.

At the neutralization step, the alkali hydroxide is mixed with the aqueous slurry of the oxidized carbon black having one or more anionic functional groups on a surface thereof, and heating/neutralization treatment is performed.

The heating temperature when the heating/neutralization is performed is preferably 30° C. to 95° C., more preferably 60° C. to 95° C., and further preferably 80° C. to 95° C.

At the neutralization step, the time during which the aqueous slurry of the oxidized carbon black having one or more anionic functional groups on a surface thereof, the alkali hydroxide, and the water-soluble chelating agent are mixed with each other and are held is preferably 30 minutes to 12 hours, more preferably 1 hour to 8 hours, and further preferably 2 hours to 5 hours.

The alkali metal hydroxide is mixed with the aqueous slurry of the oxidized carbon black so that a pH of the mixture is 6.0 to 12.0, and the neutralization treatment is performed with the temperature and the time described above, whereby the multivalent metal ions, especially divalent metal ions (such as divalent iron ions, zinc ions, nickel ions, magnesium ions, and calcium ions) captured on the surface of the oxidized carbon black and alkali metal ions are replaced with each other, and the multivalent metal ions replaced with these alkali metal ions form the multivalent metal ion chelate complex together with the aqueous chelating agent and can be easily removed at the separation and removal step as the subsequent process.

The method for producing an oxidized carbon black aqueous dispersion according to the present invention, after performing the neutralization step, performs the separation and removal step of separating and removing a multivalent metal ion chelate complex from a mixed solution obtained at the neutralization step using a separation membrane.

The separation membrane used at the separation and removal step, which is not limited to a particular separation membrane, is preferably an ultrafiltration membrane (UF), a reverse osmosis membrane (RO), or an electrodialysis membrane.

The separation membrane can separate and remove the multivalent metal ions captured on the surface of the oxidized carbon black as the multivalent metal ion chelate complex, can remove a residual salt caused by surplus alkali hydroxide to outside of the system at the same time, and is effective in preventing reflocculation of the oxidized carbon black particles.

Separation treatment at the separation and removal step may be performed to the extent that the multivalent metal ions and the residual salt caused by the surplus alkali hydroxide can be sufficiently removed to outside of the system; when the content of the oxidized carbon black is 20% by mass, for example, the separation treatment is performed until the electric conductivity of the aqueous dispersion becomes preferably 5 mS/cm or lower and more preferably 2 mS/cm or lower.

The method for producing a carbon black aqueous dispersion for an inkjet ink composition according to the present invention performs centrifugal separation treatment on an oxidized carbon black aqueous dispersion obtained by the method of the present invention to remove a coarse grain component.

The oxidized carbon black aqueous dispersion obtained by the method of the present invention may contain a coarse grain component such as large undispersed clusters and coarse grains, which is preferably removed in a classified manner by centrifugation.

A centrifuge for performing centrifugation include, which is not limited to a particular centrifuge, can be one or more selected from a vertical centrifuge, a horizontal centrifuge, and the like.

The centrifugal separation treatment may be performed with the centrifugal force of the centrifuge and a flow rate adjusted in accordance with the number of presence of a target maximum particle diameter.

By performing the classified removal treatment, the clogging of nozzles can be easily reduced when the oxidized carbon black aqueous dispersion is used for inkjet ink compositions.

Concentration is further adjusted as appropriate or an additive is added to the oxidized carbon black aqueous dispersion or the carbon black aqueous dispersion for an inkjet ink composition obtained by the method of the present invention, whereby inkjet ink can be prepared.

Concentration adjustment can be performed by adding or removing the aqueous dispersion so as to give a target concentration; it may be performed such that the concentration of the oxidized carbon black will be 0.1% to 20% by mass, for example.

The additive can be one or more selected from an antiseptic, a humectant, a resin, a surfactant, and the like.

When the humectant is used as the additive, the humectant, which is not limited to a particular humectant, can be one or more selected from ones having water dispersibility such as an ethylene glycol, a propylene glycol, a diethylene glycol, a glycerol, a dipropylene glycol, a polyethylene glycol, a polypropylene glycol, an amide, an ethers, a carboxylic acid, an ester, an alcohol, an organic sulfide, an organic sulfoxide, a sulfone, an alcohol derivative, a carbitol, a butyl carbitol, a cellosolve, an ether derivative, an amino alcohol, and a ketone.

By containing the humectant in the inkjet ink composition, the evaporation rate of the aqueous medium in the ink composition can be reduced to prevent blockages.

When the resin is used as the additive, the resin, which is not limited to a particular resin, can be one or more selected from a polyester, a polyester melamine, a styrene-acrylic acid copolymer, a styrene-acrylic acid-alkyl acrylate copolymer, a styrene-maleic acid copolymer, a styrene-maleic acid-alkyl acrylate copolymer, a styrene-methacrylic acid copolymer, a styrene-methacrylic acid-alkyl acrylate copolymer, a styrene-maleic half ester copolymer, a vinylnaphthalene-acrylic acid copolymer, a vinylnaphthalene-maleic acid copolymer, and salts thereof, for example.

By containing the resin in the inkjet ink composition, the fixation of the oxidized carbon black to a print base can be improved.

When the surfactant is used as the additive, the surfactant, which is not limited to a particular surfactant, can be any of anionic ones, nonionic ones, and cationic ones: the anionic surfactant can be one or more selected from a fatty acid salt, an alkyl sulfate ester salt, an alkyl aryl sulfonate, and the like, for example; the nonionic surfactant can be one or more selected from a polyoxyethylene alkyl ether, a polyoxyethylene alkyl aryl ether, and the like; and the cationic surfactant can be one or more selected from an alkyl amine salt, a quaternary ammonium salt, and the like.

According to the present invention, by performing on an aqueous slurry of oxidized carbon black having one or more anionic functional groups on a surface thereof a neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof is, the multivalent metal ions captured by the anionic functional groups on the surface of the oxidized carbon black are gradually captured by the chelating agent to be replaced with alkali metal ions, and subsequently, by performing a separation and removal step of separating and removing the multivalent metal ions captured by the chelating agent, a high degree of dispersibility owing to the repulsive force of the alkali metal ions can be imparted to the oxidized carbon black.

Consequently, the present invention can provide a method for easily producing an oxidized carbon black aqueous dispersion that can highly remove multivalent metal ions and exhibit excellent dispersion stability and a method for producing an oxidized carbon black aqueous dispersion for an inkjet ink composition.

EXAMPLES

The following describes the details of the present invention with reference to specific examples together with Comparative Examples; however, the present invention is not limited to these examples.

In the following Examples and Comparative Examples, pH was measured by a method stipulated in JIS Z8802.

Example 1

(1) Preparation of Slurry Containing Oxidized Carbon Black

Carbon black (TB #4500 manufactured by Tokai Carbon Co., Ltd.) in an amount of 150 g was added to 3,000 ml of a 2.0 N aqueous sodium persulfate solution using deionized water and was treated at a reaction temperature of 90° C. and a stirring rate of 300 rpm for 3 hours to undergo liquid-phase oxidation of the surface of the carbon black.

Subsequently, a reduction salt in the obtained slurry was washed with water until the electric conductivity decreased to less than 3 mS/cm using an ultrafiltration membrane (AHP-1010 manufactured by Asahi Kasei Corporation, molecular cutoff: 50,000) to perform desalination purification. The pH of the slurry containing the obtained oxidized carbon black was pH 3.

To the slurry containing the oxidized carbon black washed with water (the solid content concentration of the oxidized carbon black: 5% by mass), disodium dihydrogen ethylenediaminetetraacetate was added in an amount of 5% by mass per the oxidized carbon black solid content (relative to 100% by mass of the oxidized carbon black solid content), and the mixture was reacted at a reaction temperature of 25° C. and a stirring rate of 300 rpm for 15 minutes.

The carbon black slurry obtained through the reaction with the disodium dihydrogen ethylenediaminetetraacetate was washed with water until the electric conductivity decreased to less than 3 mS/cm by an ultrafiltration membrane (ARP-1010 manufactured by Asahi Kasei Corporation, molecular cutoff: 50,000) to perform desalination purification, whereby a slurry containing the oxidized carbon black with multivalent metal ions preliminarily separated was obtained.

(2) Neutralization Treatment

To the slurry containing the oxidized carbon black with multivalent metal ions preliminarily separated obtained at (1), disodium dihydrogen ethylenediaminetetraacetate was added in an amount of 5% by mass per the oxidized carbon black solid content (relative to 100% by mass of the oxidized carbon black solid content), sodium hydroxide aqueous solution was added so that a pH of the slurry becomes 11, and a neutralization reaction was performed at a reaction temperature of 95° C. and a stirring rate of 300 rpm for 3 hours.

(3) Separation and Removal Treatment

For the mixed solution obtained through the neutralization reaction at (2), the residual salt and chelating agent were washed with water again using an ultrafiltration membrane (AHP-1010 manufactured by Asahi Kasei Corporation, molecular cutoff: 50,000), and concentration process was performed to prepare an oxidized carbon black aqueous dispersion with an oxidized carbon black concentration of 20% by mass.

Example 2

An oxidized carbon black aqueous dispersion with an oxidized carbon black concentration of 20% by mass was prepared similarly to Example 1 except that trisodium nitrilotriacetate was used in place of disodium dihydrogen ethylenediaminetetraacetate at both (1) and (2) of Example 1.

Example 3

An oxidized carbon black aqueous dispersion with an oxidized carbon black concentration of 20% by mass was prepared similarly to Example 1 except that the reaction temperature was changed from 95° C. to 60° C. at (2) of Example 1.

Comparative Example 1

An oxidized carbon black aqueous dispersion with an oxidized carbon black concentration of 20% by mass was prepared similarly to Example 1 except that disodium dihydrogen ethylenediaminetetraacetate was not added at both (1) and (2) of Example 1.

Comparative Example 2

An oxidized carbon black aqueous dispersion with an oxidized carbon black concentration of 20% by mass was prepared similarly to Example 1 except that disodium dihydrogen ethylenediaminetetraacetate was not added at (2) of Example 1.

Comparative Example 3

An oxidized carbon black aqueous dispersion with an oxidized carbon black concentration of 20% by mass was prepared similarly to Example 1 except that the heating treatment was not performed and that the neutralization reaction was performed at room temperature (25° C.) at (2) of Example 1.

In each of the oxidized carbon black aqueous dispersions obtained in Examples 1 to 3 and Comparative Examples 1 to 3, the content of each of metal components in the oxidized carbon black aqueous dispersions was calculated by the following method. The results are listed in Table 1. In Table 1, the content of each of the metal components is listed as a metal amount (μg) contained in 1 mL of the oxidized carbon black aqueous dispersion with a concentration of 20% by mass.

(Method for Measuring Content of Metal Components)

Nitric acid liquid was added to each of the oxidized carbon black aqueous dispersions and was subjected to thermal decomposition, and the content of each of the metal components was measured by an inductively coupled plasma emission spectrometer (ICPS-7510 manufactured by Shimadzu Corporation).

The obtained results are listed in Table 1. The values in the table are the amounts of the individual metal components (μg) contained in 1 mL of the oxidized carbon black aqueous dispersion with an oxidized carbon black concentration of 20% by mass.

In Table 1, "<0.1" means "less than 0.1 μg/mL."

TABLE 1

| Metal Element | Example 1 | Example 2 | Example 3 | Comparative Example 1 | Comparative Example 2 | Comparative Example 3 |
| --- | --- | --- | --- | --- | --- | --- |
| Fe | 0.9 | 0.9 | 1.0 | 8.0 | 4.0 | 3.0 |
| Al | <0.1 | <0.1 | <0.1 | 5.0 | <0.1 | <0.1 |
| Cr | <0.1 | <0.1 | <0.1 | 3.0 | <0.1 | <0.1 |
| Ni | <0.1 | <0.1 | <0.1 | 2.0 | 1.8 | 1.0 |
| Zn | <0.1 | <0.1 | <0.1 | 0.7 | 0.7 | 0.6 |
| Ca | 0.8 | 0.8 | 0.9 | 20 | 18 | 15 |
| Mg | <0.1 | <0.1 | <0.1 | 2.0 | 1.8 | 1.5 |

(μg/mL)

Subsequently, in each of the oxidized carbon black aqueous dispersions obtained in Examples 1 to 3 and Comparative Examples 1 to 3, heat-stable (viscosity change), the average particle diameter and the maximum particle diameter of flocculates, optical density (O.D.), surface tension, and electric conductivity were measured by the following methods. The results are listed in Table 2.

<Measurement of Heat-Stable (Viscosity Change)>

When each of the oxidized carbon black aqueous dispersions was housed in a sealed container (volume: 100 ml) and was held in a warmer at 60° C. for two weeks, the viscosity change of the oxidized carbon black aqueous dispersion between immediately after starting heating and after a lapse of two weeks was measured.

The viscosity was measured using a rotational vibration type viscometer (VM-100A-L manufactured by Yamaichi Electronics Co., Ltd.).

<Measurement of Average Particle Diameter (nm) and Maximum Particle Diameter (nm) of Flocculates>

When each of the oxidized carbon black aqueous dispersions was housed in a sealed container (volume: 100 ml) and was held in a warmer at 60° C. for two weeks as described above, the average particle diameter and the maximum particle diameter immediately after starting heating and after a lapse of two weeks were measured.

The average particle diameter and the maximum particle diameter mean particle diameters with a cumulative particle size of 50% (the average particle diameter D50) and 99% (D99), respectively, in volume-based cumulative particle size distribution when measured using a heterodyne laser Doppler type particle size distribution measuring apparatus (UPA model 9340 manufactured by Microtrac). Particles experiencing Brownian motion in a suspension are irradiated with laser light by the particle size distribution measuring apparatus, and the intensity of Brownian motion, that is, the particle diameter can be measured from the degree of modulation of the frequency of scattered light modulated through the Doppler effect.

(Optical Density)

Each of the oxidized carbon black aqueous dispersions was adjusted to be diluted to give an oxidized carbon black concentration of 3% by mass and was printed on a sheet of copy paper (XEROX 4024 paper) by a #6 bar coater, and the optical density (O.D.) was measured using a Macbeth densitometer (RD-927 manufactured by Kollmorgen).

<Surface Tension>

The surface tension of each of the oxidized carbon black aqueous dispersions was measured by a surface tension measuring instrument (DN manufactured by Shimadzu Corporation).

<Electric Conductivity>

The electric conductivity of each of the oxidized carbon black aqueous dispersions was measured by an electric conductivity measuring apparatus (CM-40V manufactured by TOA Electronics Ltd.).

TABLE 2

|  | Example 1 | Example 2 | Example 3 | Comparative Example 1 |
| --- | --- | --- | --- | --- |
| Viscosity (mPa · s) | | | | |
| Immediately after starting heating | 4.44 | 4.43 | 4.62 | 4.34 |
| After 2-week heating | 3.90 | 3.58 | 3.86 | 3.58 |
| Average particle diameter of flocculates (nm) | | | | |
| Immediately after starting heating | 148 | 149 | 149 | 146 |
| After 2-week heating | 148 | 146 | 148 | 153 |
| Maximum particle diameter of flocculates (nm) | | | | |
| Immediately after starting heating | 370 | 360 | 379 | 370 |
| After 2-week heating | 393 | 363 | 380 | 398 |
| Optical density (O.D.) | 1.51 | 1.51 | 1.54 | 1.49 |
| Surface tension (mN/m) | 71.3 | 71.2 | 70.1 | 69.6 |
| Electric conductivity (mS/cm) | 0.79 | 0.80 | 0.86 | 0.80 |

It is revealed from Table 1 that the oxidized carbon black aqueous dispersions obtained in Example 1 to Example 3, which are obtained by successively performing on the water slurry of the oxidized carbon black a step of mixing the alkali metal hydroxide and performing heating/neutralization in the presence of the water-soluble chelating agent and a step of separating and removing the multivalent metal ion chelate complex from the mixed solution obtained at the previous step using the separation membrane, cause all the multivalent metal ions, or Fe ions, Al ions, Cr ions, Ni ions, Zn ions, Ca ions, and Mg ions, to be highly removed.

It is revealed from Table 2 that the oxidized carbon black aqueous dispersion obtained in Example 1 to Example 3, which are prepared through the steps and with the multivalent metal ions highly removed, are small in the viscosity change and the changes in the average particle diameter and the maximum particle diameter of flocculates, exhibit excellent dispersion stability, are excellent in optical density, surface tension, and electric conductivity, and can exhibit excellent characteristics when used for inkjet ink compositions.

In contrast, it is revealed from Table 1 that the oxidized carbon black aqueous dispersion obtained in Comparative Example 1 to Comparative Example 3, which are obtained by performing heating/neutralization without adding the water-soluble chelating agent (Comparative Example 1 and Comparative Example 2) or performing neutralization without heating (Comparative Example 3) on the water slurry of the oxidized carbon black, contain any of the multivalent metal ions, or Fe ions, Al ions, Cr ions, Ni ions, Zn ions, Ca ions, and Mg ions, in a high concentration.

It is revealed from Table 2 that the oxidized carbon black aqueous dispersion obtained in Comparative Example 1, which contains the multivalent metal ions in high concentration, is large in the change in the average particle diameter of flocculates particularly under heating, is inferior in dispersion stability, is inferior in optical density and surface tension, and is not durable against a practical use when used for inkjet ink compositions.

INDUSTRIAL APPLICABILITY

The present invention can provide a method for easily producing an oxidized carbon black aqueous dispersion that can highly remove multivalent metal ions and exhibit excellent dispersion stability and provide a method for producing an oxidized carbon black aqueous dispersion for an inkjet ink composition.

The invention claimed is:

1. A method for producing an oxidized carbon black aqueous dispersion by successively performing on an aqueous slurry of oxidized carbon black having one or more anionic functional groups on a surface thereof:
    a neutralization step of mixing an alkali metal hydroxide and performing heating/neutralization in the presence of one or more selected from a water-soluble chelating agent and a salt thereof or after mixing an alkali metal hydroxide and performing heating/neutralization, mixing one or more selected from a water-soluble chelating agent and a salt thereof,
    eluting multivalent metal ions captured by the anionic functional groups on the surface of the oxidized carbon black and replacing said multivalent metal ions with alkali metal ions of the alkali metal hydroxide to form the oxidized carbon black which the multivalent metal ions captured by the anionic functional groups on the surface are replaced with the alkali metal ions,
    forming a multivalent metal ion chelate complex together with the eluting multivalent metal ions and the aqueous chelating agent to be dissolved in the slurry,
    obtaining a mixed solution which comprises the oxidized carbon black which the multivalent metal ions captured by the anionic functional groups on the surface are replaced with the alkali metal ions and the multivalent metal ion chelate complex; and
    a separation and removal step of separating and removing the multivalent metal ion chelate complex from the mixed solution using a separation membrane.

2. The method for producing an oxidized carbon black aqueous dispersion according to claim 1, wherein at the neutralization step, the alkali metal hydroxide is mixed with the aqueous slurry of oxidized carbon black so that a pH of the mixture is 6 to 12.

3. The method for producing an oxidized carbon black aqueous dispersion according to claim 1, wherein the water-soluble chelating agent is an aminocarboxylic acid and a salt thereof.

4. The method for producing an oxidized carbon black aqueous dispersion according to claim 2, wherein the water-soluble chelating agent is an aminocarboxylic acid and a salt thereof.

5. The method for producing an oxidized carbon black aqueous dispersion according to claim 1, wherein the aqueous slurry of oxidized carbon black having one or more anionic functional groups on a surface thereof is obtained by subjecting carbon black to oxidation treatment by a liquid phase method, mixing the carbon black with one or more selected from a water-soluble chelating agent and a salt thereof under a condition of pH 2 to pH 4, and then preliminarily separating multivalent metal ions using a separation membrane.

6. The method for producing an oxidized carbon black aqueous dispersion according to claim 2, wherein the aqueous slurry of oxidized carbon black having one or more anionic functional groups on a surface thereof is obtained by subjecting carbon black to oxidation treatment by a liquid phase method, mixing the carbon black with one or more selected from a water-soluble chelating agent and a salt thereof under a condition of pH 2 to pH 4, and then preliminarily separating multivalent metal ions using a separation membrane.

7. The method for producing an oxidized carbon black aqueous dispersion according to claim 3, wherein the aqueous slurry of oxidized carbon black having one or more anionic functional groups on a surface thereof is obtained by subjecting carbon black to oxidation treatment by a liquid phase method, mixing the carbon black with one or more selected from a water-soluble chelating agent and a salt thereof under a condition of pH 2 to pH 4, and then preliminarily separating multivalent metal ions using a separation membrane.

8. The method for producing an oxidized carbon black aqueous dispersion according to claim 1, wherein the separation membrane is an ultrafiltration membrane (UF), a reverse osmosis membrane (RO), or an electrodialysis membrane.

9. The method for producing an oxidized carbon black aqueous dispersion according to claim 2, wherein the separation membrane is an ultrafiltration membrane (UF), a reverse osmosis membrane (RO), or an electrodialysis membrane.

10. The method for producing an oxidized carbon black aqueous dispersion according to claim 3, wherein the separation membrane is an ultrafiltration membrane (UF), a reverse osmosis membrane (RO), or an electrodialysis membrane.

11. A method for producing a carbon black aqueous dispersion for an inkjet ink composition performing centrifugal separation treatment on an oxidized carbon black aqueous dispersion obtained by the method according to claim 1 to remove a coarse grain component.

12. A method for producing a carbon black aqueous dispersion for an inkjet ink composition performing centrifugal separation treatment on an oxidized carbon black aqueous dispersion obtained by the method according to claim 2 to remove a coarse grain component.

13. A method for producing a carbon black aqueous dispersion for an inkjet ink composition performing centrifugal separation treatment on an oxidized carbon black aqueous dispersion obtained by the method according to claim 3 to remove a coarse grain component.

14. A method for producing a carbon black aqueous dispersion for an inkjet ink composition performing centrifugal separation treatment on an oxidized carbon black aqueous dispersion obtained by the method according to claim 4 to remove a coarse grain component.

15. A method for producing a carbon black aqueous dispersion for an inkjet ink composition performing centrifugal separation treatment on an oxidized carbon black aqueous dispersion obtained by the method according to claim 5 to remove a coarse grain component.

16. A method for producing a carbon black aqueous dispersion for an inkjet ink composition performing centrifugal separation treatment on an oxidized carbon black aqueous dispersion obtained by the method according to claim 6 to remove a coarse grain component.

17. A method for producing a carbon black aqueous dispersion for an inkjet ink composition performing centrifugal separation treatment on an oxidized carbon black aqueous dispersion obtained by the method according to claim 7 to remove a coarse grain component.

18. A method for producing a carbon black aqueous dispersion for an inkjet ink composition performing centrifugal separation treatment on an oxidized carbon black aqueous dispersion obtained by the method according to claim 8 to remove a coarse grain component.

19. A method for producing a carbon black aqueous dispersion for an inkjet ink composition performing centrifugal separation treatment on an oxidized carbon black aqueous dispersion obtained by the method according to claim 9 to remove a coarse grain component.

20. A method for producing a carbon black aqueous dispersion for an inkjet ink composition performing centrifugal separation treatment on an oxidized carbon black aqueous dispersion obtained by the method according to claim 10 to remove a coarse grain component.

* * * * *